United States Patent [19]
Lemos

[11] Patent Number: 6,098,294
[45] Date of Patent: Aug. 8, 2000

[54] HACK SAW

[76] Inventor: George Lemos, 2819 Stanford St., Fort Collins, Colo. 80525

[21] Appl. No.: 09/292,077

[22] Filed: Apr. 14, 1999

[51] Int. Cl.[7] .................................................. B27B 21/02
[52] U.S. Cl. ............................. 30/513; 030/506; 030/507
[58] Field of Search ..................................... 030/506, 507, 030/508, 513, 514

[56] References Cited

U.S. PATENT DOCUMENTS

| | | |
|---|---|---|
| D. 244,666 | 6/1977 | Kaywood . |
| D. 325,506 | 4/1992 | Michas et al. . |
| 648,992 | 5/1900 | Peterson ..................................... 30/506 |
| 803,694 | 11/1905 | Jones . |
| 903,495 | 11/1908 | Parsons . |
| 948,151 | 2/1910 | Ullrich . |
| 1,190,477 | 7/1916 | Sprague . |
| 1,929,989 | 10/1933 | Priest . |
| 2,102,782 | 12/1937 | Blum . |
| 2,213,841 | 9/1940 | Hubeck . |
| 2,221,231 | 11/1940 | Cassidy . |
| 2,799,309 | 7/1957 | Olesen . |
| 3,822,731 | 7/1974 | Keymer . |
| 4,256,156 | 3/1981 | Biszantz et al. . |
| 5,063,675 | 11/1991 | Michas et al. . |
| 5,388,333 | 2/1995 | Chen .......................................... 30/507 |
| 5,706,585 | 1/1998 | Wang ......................................... 30/513 |
| 5,873,170 | 2/1999 | Stanley ....................................... 30/513 |

FOREIGN PATENT DOCUMENTS 0286613  3/1988  European Pat. Off. .

*Primary Examiner*—Hwei-Siu Payer
*Attorney, Agent, or Firm*—Allen H. Erickson

[57] ABSTRACT

An improved hacksaw for rigorous use has two embodiments, one with a high available cutting depth exceeding five inches, and another with a low clearance with attendant low cutting depth. The saw is easily constructed of inexpensive materials and has a blade alignment bow whereby forces exerted on the bow by the blade are closely aligned to minimize lateral bending and enable precise cuts.

19 Claims, 4 Drawing Sheets

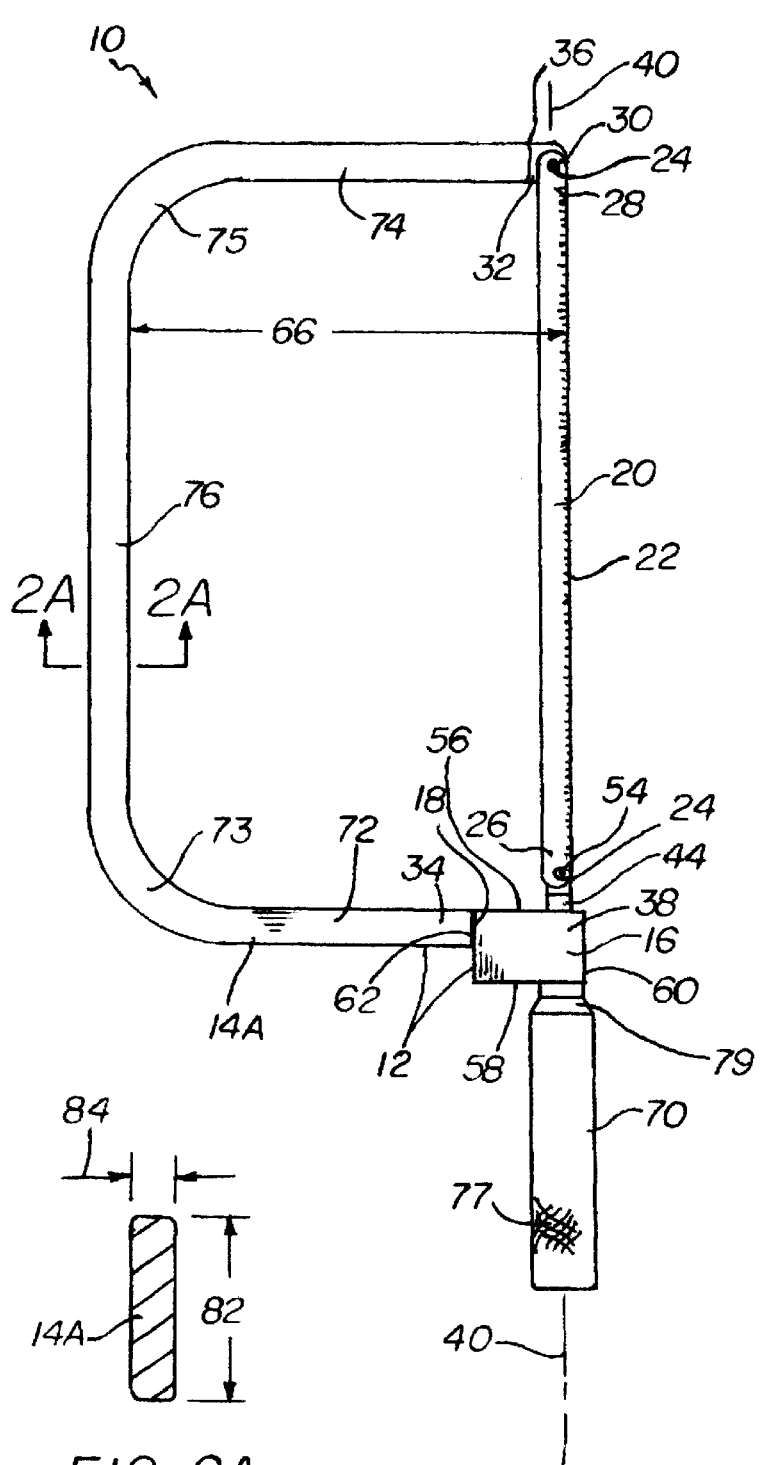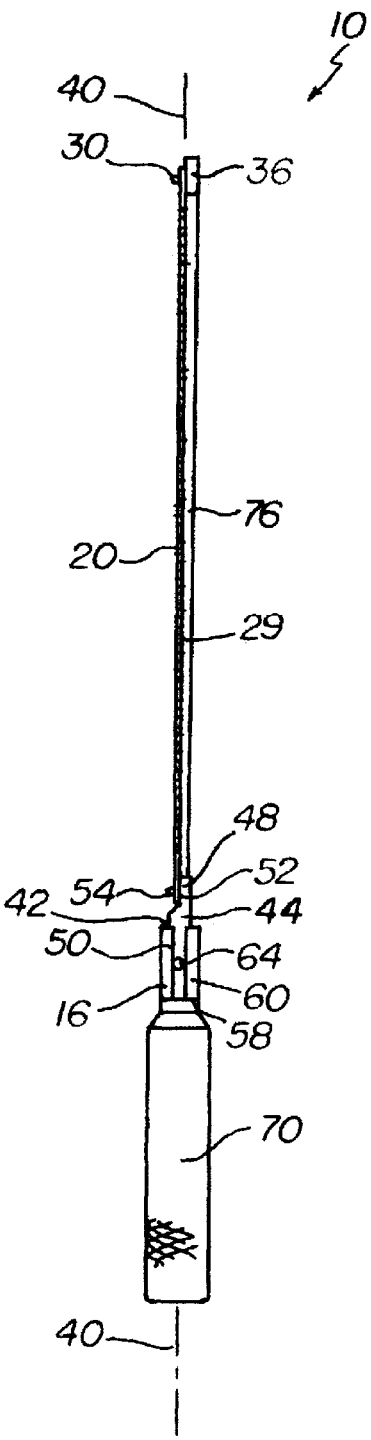
FIG. 2A
FIG. 1
FIG. 2

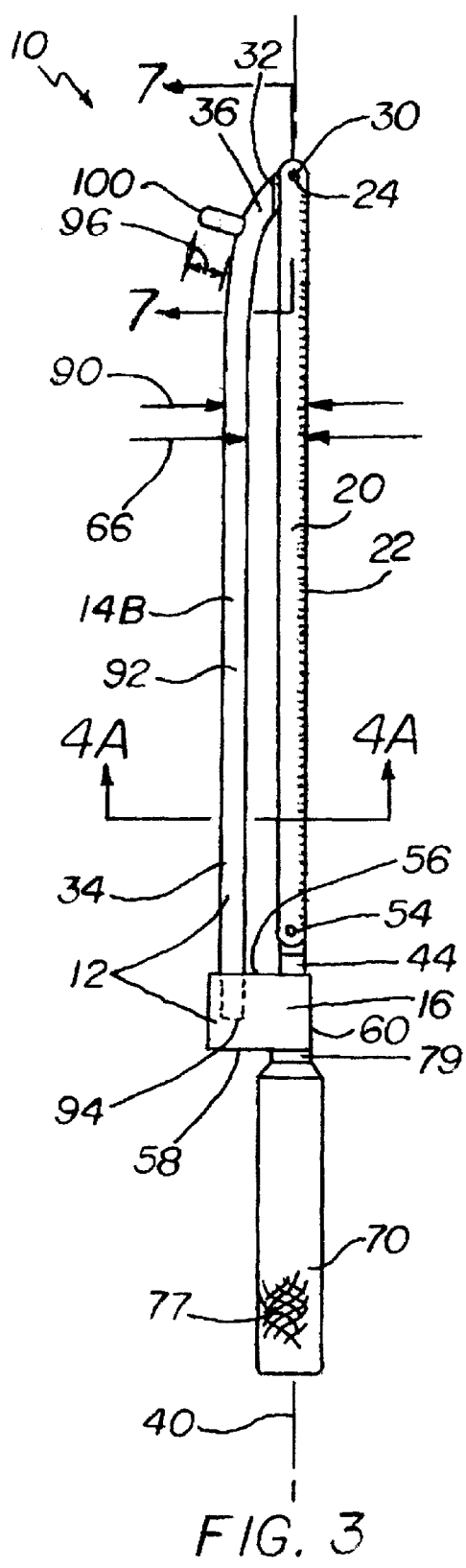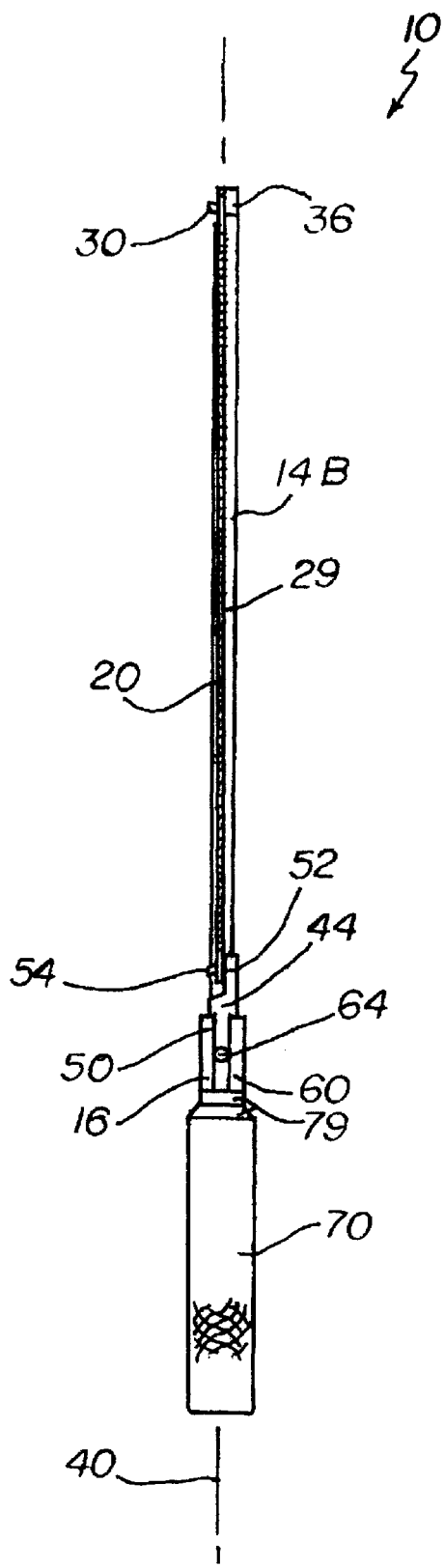

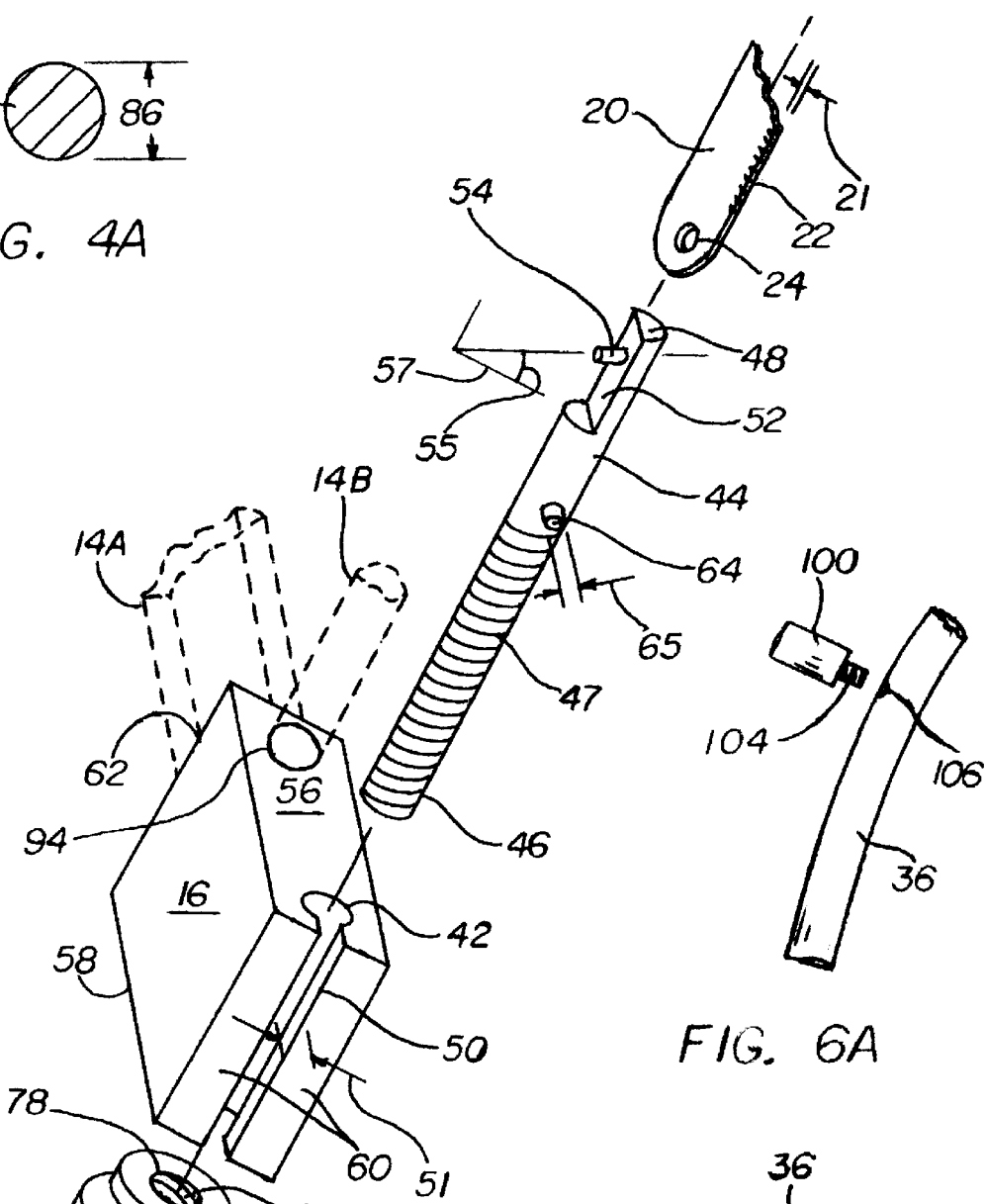

HACK SAW

BACKGROUND OF THE INVENTION

1. Field of the Invention

This invention relates generally to saws for high stress cutting of hard materials including metals and plastics. More particularly, the invention pertains to hand saws for use with conventional hack saw blades.

2. State of the Art

Hack saws have been in use for many decades, and have taken several forms. They are typically designed for cutting metal or other hard materials, and because of the high resistance offered by such materials, require strong frames to withstand high axial forces tending to bend the frames.

In the construction trades, conventional hack saws are used to cut pipes, tubing, sheet metal, plastic foam sheeting, fiberboard, and even bricks and the like. Various blades are available for cutting specific materials. High arm forces are often required to overcome the resistance to cutting of such materials, and hack saws are often used overhead, or in narrow or otherwise confined spaces. The high forces used sometimes break the hack saw blade, or even the saw frame, as is well known to those in the construction trades.

An early hack saw design is shown in U.S. Pat. No. 1,190,477 of Sprague. Both ends of the blade are adjustable on the frame to vary the cutting depth, but the maximum cutting depth appears to be less than 4 inches (10.16 cm.), assuming the blade pictured is a conventional long hack saw blade of 10 inches length. Furthermore, the frame uprights are not adjustable in length and project toward the workpiece being cut, making the blade adjustability of limited value.

Various hack saw apparatus are shown in U.S. Pat. No. 2,102,782 of Blum, U.S. Pat. No. 2,213,841 of Hubeck, U.S. Pat. No. 2,221,231 of Cassidy, U.S. Pat. No. 2,799,309 of Olesen, U.S. Pat. No. 3,822,731 of Keymer, and U.S. Pat. No. 4,256,156 of Biszantz et al. Various blade attachment devices and handle configurations are described. The Olesen patent describes a knob-shaped handle attachable to a hack saw frame. The purpose of the handle is stated to be for exerting high forces on the saw with a free hand. As is readily seen, any hand movement which tends to turn the knob may loosen the handle and cause it to slide on the saw frame. Moreover, the knob is of such a width that it interferes with cutting within a relatively narrow space.

Several versions of coping saws are illustrated in U.S. Pat. No. 803,694 of Jones, U.S. Pat. No. 903,495 of Parsons, and U.S. Pat. No. 1,929,989 of Priest. Coping saws have weak blades of small cross-section and length, and are used for cutting soft materials such as wood and soft plastic. Such saws have also been called "scroll" saws inasmuch as the thin blade may be rotated while cutting to form complex arcuate cuts. Coping saw frames and blades cannot tolerate high forces typical in the use of hack saws. Unlike hack saw blades, coping saw blades have a thin pin at each end for attachment to the saw frame. The blade is attached so that the saw cuts on the pulling stroke, rather than the pushing stroke, to prevent damage to the blade or frame.

U.S. Pat. No. 948,151 of Ullrich shows a miniature saw for use by jewelers.

Hack saws with very limited cutting depth are shown in U.S. Pat. No. 244,666 of Kaywood as well as in U.S. Pat. No. 325,506 and U.S. Pat. No. 5,063,675, both of Michas et al. Because of the limited size of the saw frame, the saw is typically operated with only one hand, making precise cutting difficult.

European Patent Application No. 88850104.6 of Sandvik shows a handle to which one end of a hack saw blade is attached. A central portion of the blade floats in a slot in an arm. The saw may be used in confined spaces, but the blade will not withstand any substantial force without bending, since the blade is not in tension and depends only upon its own resistance to bending.

None of the above noted documents show a hack saw suited for high stress application which has a cutting depth of more than about 4.0 inches (10.16 cm.). Furthermore, the applicant, being a construction contractor in the building trades, is unaware of the commercial availability of a high-clearance hack saw.

None of the above patents shows a hack saw of low cutting depth which may be readily used for precision cutting in closely confined spaces.

Many of the hack saws shown in the documents have very complex construction leading to high production costs.

The need for an inexpensive hack saw construction resulting in improved utility under rigorous use is resolved by the invention described below.

BRIEF SUMMARY OF THE INVENTION

The invention comprises an improved hack saw apparatus which is particularly configured for use under strenuous conditions, such as encountered in the construction trades. The hack saw is useful for cutting hard materials such as ceramics, sheetrock, metals, brick, and the like, as well as relatively soft materials such as styrofoam and other formed plastics. Any blade configured for attachment to conventional hack saws may be advantageously used with the hack saw of this invention.

This invention is illustrated in two embodiments, one being a saw capable of cutting items of much increased depth, and the other being a saw with a very limited cutting depth, which is particularly useful in cramped spaces.

BRIEF DESCRIPTION OF THE DRAWINGS

The invention is illustrated in the following figures, wherein some elements are not necessarily shown to scale. Identical numerals are used throughout the drawings to denote the same or similar parts.

FIG. 1 is a right side view of a hack saw in accordance with the present invention;

FIG. 2 is a bottom view of a hack saw in accordance with the present invention;

FIG. 2A is an enlarged cross-sectional view of a bow in accordance with the hack saw of the invention, as taken along line 2A—2A of FIG. 1;

FIG. 3 is a right side view of another embodiment of a hack saw in accordance with the present invention;

FIG. 4 is a bottom view of another embodiment of a hack saw in accordance with the present invention;

FIG. 4A is an enlarged cross-sectional view of a bow in accordance with the hack saw of the invention, as taken along line 4A—4A of FIG. 3;

FIG. 5 is an enlarged exploded perspective view of the blade attachment portion of a hack saw in accordance with the present invention;

FIG. 6 is a reduced partial right side view of another embodiment of a hack saw of the invention;

FIG. 6A is a partial right side view of another embodiment of the hack saw of the invention.

DESCRIPTION OF THE ILLUSTRATED EMBODIMENTS

Figure 7:
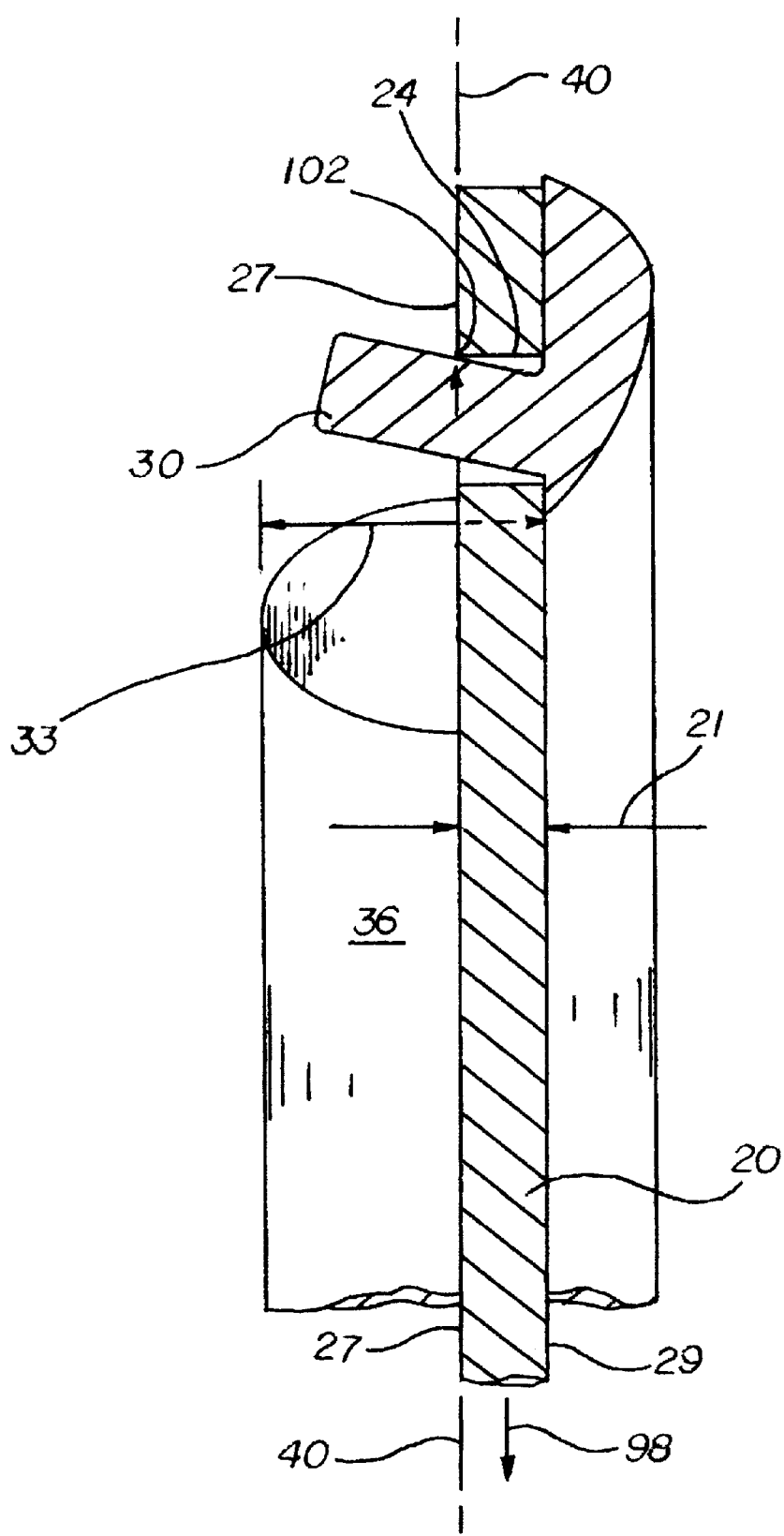
FIG. 7 is a partial enlarged bottom sectional view of the distal end of a hack saw of the invention illustrating forces acting on the saw during cutting operations.

One embodiment of the hack saw 10 is illustrated in FIGS. 1 and 2. As shown, the hack saw 10 includes a frame 12 which comprises a bow 14A and a headblock 16 having an upper end 62 affixed to the proximate end 34 of the bow by weldment 18. The elongate bow 14A is formed of a laterally flattened rod of steel or stainless steel which is hardened for high strength and rigidity. A connector pin 30 is welded to a flattened or cut-out area 32 at the distal end 36 of the bow 14A to angularly project forwardly. The connector pin 30 is inserted into an attachment hole 24 in a hack saw blade 20 to retain the blade in the saw. The bow 14A spans the length of a standard ten-inch hack saw blade 20.

The headblock 16 is formed of steel or stainless steel. At its lower portion 38 is a borehole 42 extending from the front face 56 to the rear face 58; a tension screw 44 is configured to pass through the borehole 42 for connecting an in-line handle 70 having internal threads 68 to the cutting blade 20. A slot 50 traverses the lower end 60 of the headblock 16 parallel to borehole 42, and intersects borehole 42 along its length.

As more clearly depicted in FIG. 5, the tension screw 44 has a first end 46 which has screw threads 47, and a second end 48 with a cut-out or flattened portion 52. A second connector pin 54 is welded to the flattened portion 52 as shown for holding a saw blade 20. A slide pin 64 is attached by e.g. welding or brazing to the tension screw 44 forward of threaded end 46 and is intended to closely slide within slot 50 to prevent the tension screw 44 from rotating. Slide pin 64 may be formed of standard steel or stainless steel rod of e.g. about 0.125 inch (0.3175 cm.) diameter 65, and of a length sufficient to prevent rotation of tension screw 44 without itself projecting from slot 50. The width 51 of slot 50 is of course slightly greater than the diameter 65 of slide pin 64.

A standard 10-inch (25.4 cm.) hack saw blade 20 with cutting teeth 22 is shown with attachment holes 24 at its proximate end 26 and distal end 28. First and second connector pins 30 and 54 are configured for passage through attachment holes 24 in the blade 20 to attach the blade to the frame 12. For currently available blades 20, the connector pins 30, 54 are about 0.125 inch (0.3175 cm.) or somewhat less in diameter, and are formed of standard steel or stainless steel rod. The connector pins 30, 54 are welded at an angle 55 away from the blade 20, for holding the blade 20 in tension therebetween. Angle 55 is typically about 5 to about 30 degrees from a line 57 normal to axis 40.

The handle 70 has a generally round cross-section with a knurled or otherwuse grippable outer surface 77. At its working end 79 is an axial hole 78 with internal screw threads 68, for accepting the external screw threads 47 of the tension screw 44. The handle 70 may be formed of tubular metal or plastic for example, with a working end 79 of reduced diameter. A front collar 80 of the working end 79 has a smooth surface which is rotatable against the rear face 58 of the headblock 16. Rotation of the handle 70 in one direction 88 draws tension screw 44 into the handle and tightens the blade 20 to the desired tension, preventing it from lateral bending and "binding" in the kerf. Rotating handle 70 in the opposite direction loosens the blade 20 for removal or replacement.

The hack saw 10 is configured so that the in-line handle 70, borehole 42, tension screw 44, bow 14A and blade 20 are aligned along axis 40 for direct application of pushing and pulling forces therealong.

As shown, the bow 14A has a rear strut 72, a front strut 74, and a center span 76, connected in a U-shape by arcuate corners 73 and 75. The distance from the cutting teeth 22 to the center span 76 is considered to be the available cutting depth 66. In this embodiment, the cutting depth 66 is in excess of five (5) inches (12.7 cm.) and may be as much as about seven (7) inches (17.78 cm.) or more. This available cutting depth 66 is much greater than any other hack saw known to the applicant, and enables the cutting of objects of significantly greater thickness.

FIG. 2A shows a cross-section of flattened bow 14A. The depth 82 of the straight portions 72, 74 and 76 of bow 14A are at least two times the width 84, and preferably at least 4 times the width. The arcuate corners 73, 75 may have greater depth/width ratios than the straight portions 72, 74, 76, i.e. up to about 5–7.

In FIG. 5, a portion of bow 14A is shown in hatched lines. Another embodiment of the hack saw 10, described infra, uses a nearly straight bow 14B as shown further in FIGS. 3 and 4. As depicted in FIG. 4A, the bow 14B is generally circular in cross section with a diameter 86.

In this second embodiment of the invention particularly shown in FIGS. 3 and 4, a hack saw 10 particularly differs from the embodiment of FIGS. 1 and 2 with respect to the frame 12. The bow 14B is attached to the front face 56 of headblock 16 and extends forwardly therefrom. The distal end 36 of bow 14B is bent downwardly for attaching a blade 20 thereto, generally parallel to the straight portion 92 of the bow. The cutting clearance 90 is minimized for use in very close quarters, and results in a limited cutting depth 66 slightly less than the clearance. As an example, a saw 10 with a cutting depth 66 of 1.1875 inches (3.016 cm.) will have a cutting clearance 90 of about 1.25 inches (3.175 cm.).

While the bow 14B may have a generally quadrangular shape as depicted in FIG. 2A, it is shown in FIGS. 3, 4 and 4A with a generally circular shape, preferably with a diameter 86 of about 0.25–0.375 inches (about 0.635–0.9525 cm.).

In a preferred embodiment, the proximate end 34 of bow 14B is anchored in a hole 94 in headblock 16 by welding or brazing.

The headblock 16 with hole 94 may be used with either type of bow 14A or 14B.

A portion 32 of the distal end 36 of bow 14B is flattened or cut away and a connector pin 30 welded thereto, as previously described in reference to FIGS. 1 and 2.

Another feature shown in FIG. 3 is a finger post 100 rigidly fixed by e.g. welding to the bow 14B near its distal end 36. The finger post 100 has a length 96 of about 0.625–0.75 inches (1.5875–1.905 cm.). The finger post 100 is useful in guiding the distal end 36 of the hack saw 10 in making accurate cuts, and is adapted for manipulation by the offhand fingers of the sawer. Preferably, the finger post 100 has a width or diameter not greater than width 84 or diameter 86 of the bow 14A, 14B.

FIG. 6 shows another embodiment of finger post 100, being in the shape of a generally spherical ball which is welded to bow 14B.

Another embodiment of the finger post 100 is depicted in FIG. 6A as having a threaded post 104 which screws into a threaded hole 106 in the bow end 36.

Either embodiment of finger post 100 may be fixed to bow 14A of FIGS. 1 and 2, preferably on corner 75.

In one form of the invention, the saw 10 is configured for at attachment of the blade 20 to the right side (i.e. visible side in FIGS. 1 and 3) of the distal end 36 of bow 14A or 14B. In FIG. 7, it can be seen that forces 98 exerted on the connector pin 30 by blade 20 occur primarily on the right side 27 rather than left side 29 of the blade, at corner 102 of attachment hole 24. The depth 33 of the flattened or cut away area 32 of bow 14A or 14B is configured so that the right side 27 of the blade 20 lies close to or on the axis 40. The cut away or flattened depth 33 is approximately equal to the sum of (a) one-half of the bow thickness 84 or 86 plus (b) the thickness 21 of blade 20. Thus, the forces 98 (see FIG. 7) are directed along the central bow axis 40 to minimize bending forces on the bow 14A or 14B in either lateral direction. The use of a split bow end with easily misplaced or lost cotter pins, as shown in the prior art, is eliminated, and less lateral "binding" of the blade 20 occurs during cutting operations.

While FIG. 7 further illustrates the embodiment of FIGS. 3 and 4, the blade alignment feature may be applied to any embodiment of the invention including that of FIGS. 1 and 2.

Furthermore, the blade alignment feature is described in a preferred embodiment as having the blade 20 attached to the right side of the bow 14A, 14B. In another embodiment, the right and left sides are in a reversed configuration, i.e. the blade 20 is attached to the left side of the bow 14A, 14B.

It can be seen that the several embodiments of saw 10 may be easily and inexpensively manufactured. The mechanisms of the saw are simple and straightforward. The saw is of high strength, is highly balanced, and has no small removable parts which may become lost or misplaced.

It is apparent to those skilled in the art that various changes, additions and modifications may be made in the improved saw apparatus as disclosed herein without departing from the spirit and scope of the invention as defined in the following claims.

What is claimed is:

1. A hack saw, comprising:
    a bow configured to span the length of a hack saw blade between a proximate end and a distal end of said bow;
    a headblock rigidly fixed to said proximate end of said bow, said headblock having a front face, a rear face, an upper end and a lower end, and having a borehole passing therethrough from said front face to said rear face;
    a slot in said headblock parallel to and intersecting said borehole;
    a tension screw having a central axis and passable through said borehole, said tension screw having a threaded first end, a second end, a second connector pin fixed to said second end for attachment to said hack saw blade, and a slide pin fixed at a right angle with said second connector pin to slide in said slot;
    a blade attachment means fixed to the distal end of said bow;
    a handle having an internal screw thread into which said threaded first end of said tension screw may be inserted, said handle screwed to tighten said hack saw blade to a cutting tension.

2. The hack saw of claim 1, wherein said blade attachment means comprises:
    a cut away portion of said distal end of said bow, said cut away portion having a depth equal to the sum of one-half of the bow thickness and the blade thickness; and
    a first connector pin fixed to said bow within said cut away portion for attaching said blade thereto, said first connector pin angled forwardly to retain said blade.

3. The hack saw of claim 2, wherein said depth aligns an outer side of said blade with the central axis of said bow.

4. The hack saw of claim 3, wherein said outer side of said blade comprises the right side.

5. The hack saw of claim 1, wherein said bow has a rear strut, a front strut, and a center span connecting said struts, said center span substantially parallel to a blade attached to said struts.

6. The hack saw of claim 5, wherein the distance between said center span and the cutting edge of said blade comprises an available cutting depth of at least 5 inches (12.7 cm.).

7. The hack saw of claim 5, wherein the distance between said center span and the cutting edge of said blade comprises an available cutting depth of at least 6 inches (15.24 cm.).

8. The hack saw of claim 5, wherein said bow has a generally quadrangular cross-section with a height exceeding 2 times the width thereof.

9. The hack saw of claim 5, wherein said bow has a generally quadrangular cross-section with a height exceeding 4 times the width thereof.

10. The hack saw of claim 5, wherein said struts and the center span are connected by arcuate corner members of generally quadrangular cross-section with the height thereof exceeding 2 to 7 times the width thereof.

11. The hack saw of claim 1, wherein said bow comprises a single member with a predominant straight portion extending from said proximate end thereof and a smaller curved portion at said distal end thereof.

12. The hack saw of claim 11, wherein said bow has a generally circular cross-section.

13. The hack saw of claim 11, wherein said bow has a generally circular cross-section of diameter about 0.25 to about 0.375 inches (about 0.635 to about 0.9525 cm.).

14. The hack saw of claim 1, further comprising a finger post fixed near the distal end of said bow for finger manipulation of said saw.

15. The hack saw of claim 14, wherein said finger post has a width not exceeding the width of said bow.

16. The hack saw of claim 14, wherein said finger post has a length not exceeding about 0.75 inches (1.905 cm.).

17. The hack saw of claim 14, wherein said finger post comprises a spherical ball.

18. The hack saw of claim 14, wherein said finger post comprises a round rod.

19. The hack saw of claim 14, wherein said finger post includes a threaded post insertable into a threaded hole in said bow.

\* \* \* \* \*